United States Patent [19]
Umemura

[11] 3,911,456
[45] Oct. 7, 1975

[54] MULTIPLE EXPOSURE PHOTOGRAPHY ASSEMBLY FOR A CAMERA

[75] Inventor: Yukio Umemura, Tokyo, Japan

[73] Assignee: Asahi Kogaku Kogyo Kabushiki Kaisha, Japan

[22] Filed: Dec. 21, 1973

[21] Appl. No.: 427,215

[30] Foreign Application Priority Data
Dec. 30, 1972 Japan.................................. 48-454

[52] U.S. Cl. .............................................. 354/209
[51] Int. Cl.². ........................................ G03B 19/32
[58] Field of Search.................... 354/209, 204, 217

[56] References Cited
UNITED STATES PATENTS
3,650,191  3/1972  Nomura.............................. 354/209
3,687,039  8/1972  Furuta............................... 354/209

Primary Examiner—John M. Horan
Attorney, Agent, or Firm—Marn & Jangarathis

[57] ABSTRACT

A multiple exposure photography assembly is disclosed for a camera of the type having a shutter charge mechanism and a separate film winding mechanism wherein an externally operated member is provided to act to disengage a ratchet claw from a ratchet included in the film winding mechanism to disconnect the transmission of the film winding mechanism to prevent the frame dial from advancing but to permit the shutter charge mechanism to operate for multiple exposure. A stop member is provided for disengaging the externally operated member from its operational position with the ratchet claw under the action of the winding drive mechanism so that in the terminal sequence of each winding operation, the externally operated member is returned to its initial sequence and the camera readied for normal operation.

2 Claims, 5 Drawing Figures

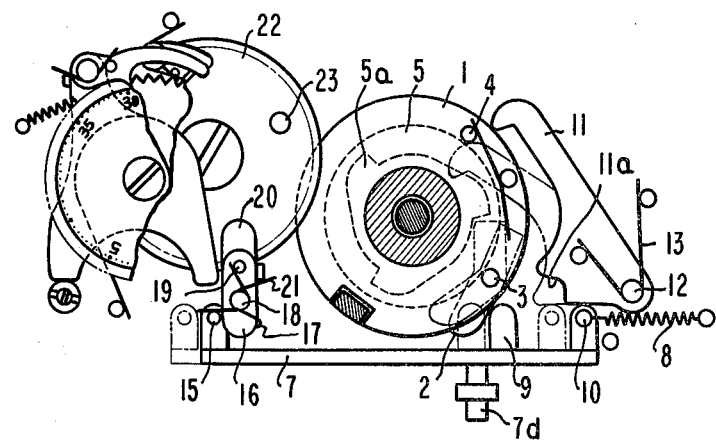
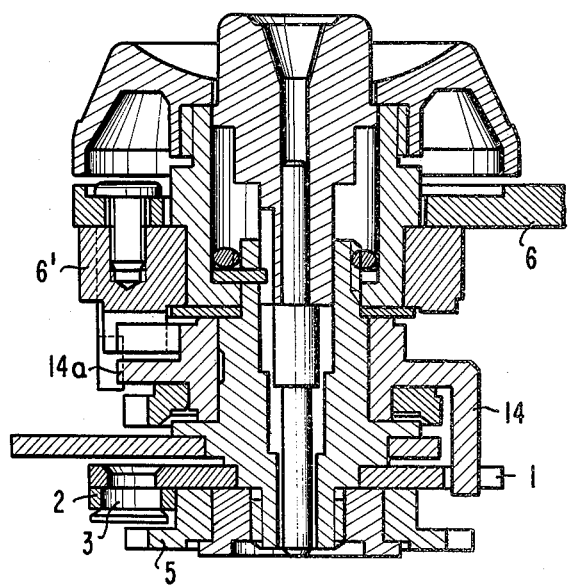

MULTIPLE EXPOSURE PHOTOGRAPHY ASSEMBLY FOR A CAMERA

This invention relates to a multiple exposure photography assembly, and more particularly to a multiple exposure photography assembly to effect a multiple exposure photography by resetting successively the shutter to the previous photography operation. Still further, this invention relates to a multiple exposure photography assembly of simple construction for use in a camera provided with a driving force transmission mechanism for shutter charging and a separate driving force transmission mechanism for film winding including film spools, sprockets, and the like, said multiple exposure photography assembly permitting multiple exposure photography and allowing the camera to recycle to an original photography condition.

BACKGROUND OF THE INVENTION

A conventionally known multiple exposure photography assembly is normally provided with a clutch mechanism arranged between the film spool and a sprocket which can be driven upon film winding. In such an assembly, the transmission of the driving force to the film spool is disconnected under control of the clutch mechanism with the shutter being thereafter charged for multiple exposure.

OBJECT OF THE INVENTION

An object of the present invention is to provide a novel multiple exposure photography assembly for a camera.

SUMMARY OF THE INVENTION

The multiple exposure photography assembly of the present invention consists of a shutter mechanism and a film winding mechanism separately arranged from one another. A clutch assembly is provided to disengage the film winding mechanism but to allow the shutter mechanism to be reset independently of the film winding mechanism.

BRIEF DESCRIPTION OF THE DRAWINGS

A better understanding of the present invention as well as other objects and advantages thereof will become apparent upon consideration of the detailed disclosure thereof, especially when taken with the accompanying drawings, wherein like numerals designate like parts throughout.

FIG. 4 is a plane view illustrating the mechanical portion of the multiple exposure photography assembly of FIG. 3; and FIG. 5 is a vertical section of the drive portion of the multiple exposure photography assembly of FIG. 3.

DETAILED DESCRIPTION OF THE DRAWINGS

Figure 1:
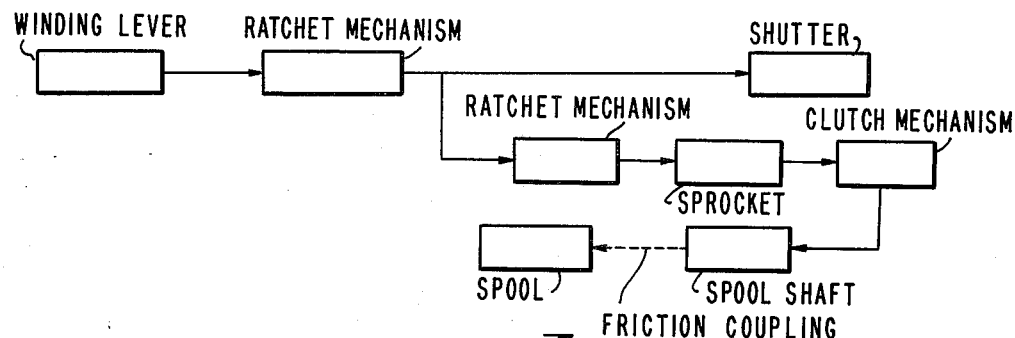
FIG. 1 is a schematic diagram illustrating a film winding device for a camera of the prior art.
Figure 2:
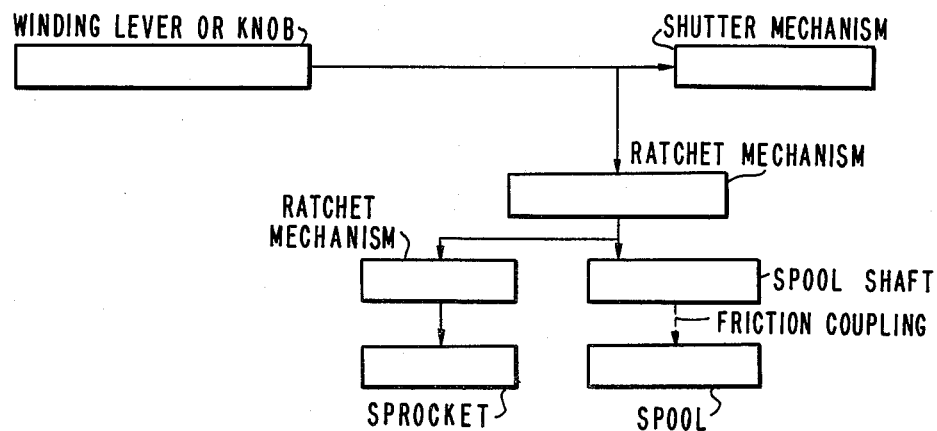
FIG. 2 is a schematic diagram illustrating an embodiment of the present invention.

Referring now to FIGS. 2 and 4, there is illustrated the multiple exposure photography assembly of the present invention, including a connecting plate 1 provided with a claw 2 pivotably mounted on a shaft 3. The claw 2 is biased counter-clockwise (as viewed in FIGS. 3 and 4) by means of a spring 4 contacting the claw 2 at one end thereof so that the claw 2 is normally forced to engage with one of the protruded portions 5a of a winding gear 5. Upon operation of a winding lever 6, the claw 2 is caused to rotate the winding gear 5, which in turn effects rotation of a sprocket and a film spool (not shown) by means of a gearing means.

An actuation plate 7 is provided having a pair of elongated slots 7a for slidably receiving pins projecting from an immovable portion of the camera. The actuation plate 7 is normally biased to the right (as viewed in FIGS. 3 and 4) by a spring 8 and is slidably movable to the left by means of a knob 7d projecting from the actuation plate 7. Upon movement of the actuation plate 7 to its operative position (i.e., from right to left as viewed in FIG. 4), for the purpose of multiple exposure photography, a pin 9 mounted on the plate 7 is caused to engage an end of the claw 2 to move the other end out of engagement with the protruded portion 5a of the winding gear 5. Consequently, upon operation of the winding lever 6, the rotation of the connecting plate 1 (rotatable together with the winding lever 6 by means of a lever support 6a and a clutch 14) is not transmitted to the winding gear 5.

Figure 3:
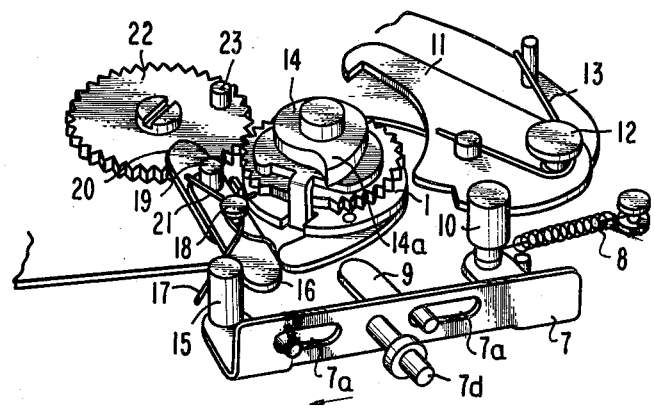
FIG. 3 is an isometric view illustrating the mechanical portion of the multiple exposure photography assembly of the present invention.

A pin 10 is provided on another portion of the actuation plate 7 and is normally engaged by an arrester plate 11 pivotably mounted upon a shaft 12 and rotatably biased by spring 13 (as viewed in FIGS. 3 and 4). Upon movement of the actuation plate 7 to the operative position, the pin 10 of the actuation plate 7 is caused to engage a step portion 11a provided on the arrester plate 11 thereby preventing restoration movement of the actuation plate 7 due to the tension of the spring 8. At the terminal sequence of the winding operation, the arrester plate 11 is engaged by a projecting portion 14a on the clutch 14 to cause the arrester plate 11 to rotate in a clockwise direction (as viewed in FIG. 3), thereby releasing the actuation plate 7 to cause the plate 7 to return to an inoperative mode by the tension of the spring 8.

A pin 15 is mounted on another portion of the actuation plate 7 and engages a frame dial drive lever 16 biased by a spring 17. The lever 16 is pivotably mounted on a shaft 18 having a pin 19 which engages the frame dial mechanism. An interlocking plate 20 is pivotably mounted on a shaft together with the lever 16 and is coupled to the lever 16 by means of a spring 21.

In normal operation, the interlocking plate 20 is within the operational region of a pin 23 mounted on a first winding gear 22, and is engaged by the pin 23 and the pin 19 during film winding by way of the frame dial drive lever 16 to thereby advance the frame dial by a tooth during each film winding operation. Upon restoration of the winding gear 22, the pin 23 is caused to displace solely the interlocking plate 20 against the action of the spring 21, but does not act on the frame dial drive lever 16.

In multiple exposure photography, the interlocking plate 20, following the movement of the actuation plate 7 away from the operational region of the pin 23, is caused to be disengaged from the frame dial mechanism. Consequently, the frame dial is no longer caused to be advanced by the winding operation but maintains the same position. It is understood that the frame dial mechanism may be one known to those skilled in the art.

Referring particularly to FIG. 4, the frame dial mechanism is illustrated as being provided with an advancing claw and a retaining claw. In multiple exposure photography, upon movement to the left of the actuation plate 7, the pin 10 is caused to rotate and lock the arresting plate 11 in an inoperative position. At the same time, the frame dial lever 16 is caused to move (following the movement of the pin 15) out of the operational region of the pin 23, with the pin 19 being thereby disengaged from the frame dial mechanism. Upon restoration of the actuation plate 7 to the inoperative position, the claw 2 is caused to rotate counter-clockwise from the engagement of the pin 9 with one end thereof to thereby disengage the Claw 2 from a protruded portion 5a of the winding gear 5. Under such condition, the winding operation thereby actuates only the shutter mechanism.

Toward the terminal sequence of the winding operation, the projection 14a of the clutch 14 is caused to engage the forward end of the arrester plate 11 thereby rotating same in a clockwise direction. The actuation plate 7 is released and restored by the action of the spring 8 to force the pin 15 against the interlocking plate 20 to return the plate 20 into the operational region of the pin 23. The operational sequence for the multiple exposure is reset after each winding operation to prevent unwanted multiple exposures.

While the invention has been described in connection with one embodiment thereof, it will be understood that many modifications will become apparent to one skilled in the art, and that this application is intended to cover any such adaptations or variations thereof.

What is claimed is:

1. A multiple exposure photographic assembly for a camera having a shutter charge mechanism and a film winding mechanism wherein said film winding mechanism includes a ratchet means for driving a film spool and a claw means mounted for rotation on a winding lever for engaging said ratchet means which comprises:

an actuation plate means slideably mounted on said camera proximate to said film winding mechanism for selectively disengaging said claw means of said film winding mechanism after film exposure, said actuation plate means including first and second pin means, said first pin means disengaging said claw means from said ratchet means upon movement of said actuation plate means into operational mode; and an arrester plate means rotatably mounted on said camera to lock said actuation plate means in operational mode by engagement with said second pin means, said arrester plate means being in contact with said claw means in operational mode whereby rotational movement of said claw means in response to said winding lever causes said arrester plate means to move out of disengagement with said second pin means and thereby return said actuation plate to an initial position.

2. The multiple-exposure photographic assembly as defined in claim 1 wherein said actuation plate means disengage a film counter index of said camera.

* * * * *